(12) United States Patent
Fujita (10) Patent No.: US 7,411,520 B2
(45) Date of Patent: Aug. 12, 2008

(54) ENCODER

(75) Inventor: Hiromasa Fujita, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 11/479,263

(22) Filed: Jun. 30, 2006

(65) Prior Publication Data

US 2007/0008192 A1    Jan. 11, 2007

(30) Foreign Application Priority Data

Jul. 8, 2005    (JP) .............................. 2005-200360

(51) Int. Cl.
*H03M 1/22* (2006.01)
(52) U.S. Cl. ................ 341/7; 341/50; 341/51
(58) Field of Classification Search .............. 341/7, 341/50, 51; 235/449; 702/158
See application file for complete search history.

(56) References Cited

U.S. PATENT DOCUMENTS 5,299,143 A * 3/1994 Hellinga et al. ............. 702/158
5,949,051 A * 9/1999 Kiriyama ..................... 235/449
6,437,723 B1 * 8/2002 Otsuka et al. ............... 341/155

FOREIGN PATENT DOCUMENTS

JP    2001-56238    2/2001

* cited by examiner

*Primary Examiner*—Jean B Jeanglaude
(74) *Attorney, Agent, or Firm*—Scully, Scott, Murphy & Presser, P.C.

(57) ABSTRACT

An encoder has a scale having an optical, magnetic or electrostatic displacement detection pattern. An encoder head detects the displacement detection pattern and generates at least two periodic signals that differ in phase, thereby to determine a displacement with respect to the scale. A center-voltage detecting unit detects only the center voltage of each periodic signal. A reference-voltage adjusting unit adjusts the center voltage detected by the center-voltage detecting unit to a predetermined reference voltage.

19 Claims, 6 Drawing Sheets

ENCODER

CROSS-REFERENCE TO RELATED APPLICATIONS

This application is based upon and claims the benefit of priority from prior Japanese Patent Application No. 2005-200360, filed Jul. 8, 2005, the entire contents of which are incorporated herein by reference.

BACKGROUND OF THE INVENTION

1. Field of the Invention

The present invention relates to an encoder for use in, for example, displacement sensors.

2. Description of the Related Art

An encoder generates periodic signals that differ in phase. The periodic signals output from the encoder and different in phase are input to a processing circuit, which counts cycles per unit time. The processing circuit can acquire data from the periodic signals input to it. The data represents, for example, the direction of movement, position, displacement and speed of a moving body.

Figure 10:
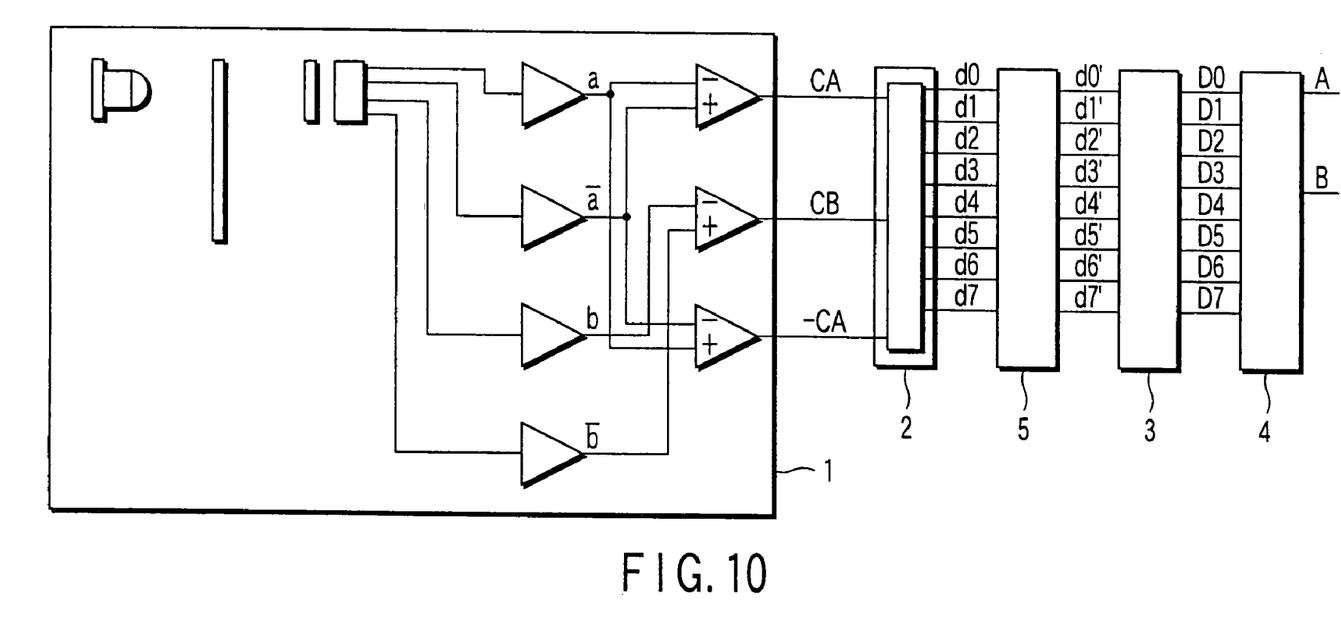
FIG. 10 is a diagram showing the configuration of a conventional encoder.

Jpn. Pat. Appln. KOKAI Publication No. 2001-56238 discloses an encoder shown in FIG. 10. As shown in FIG. 10, the encoder has an original-signal generating means 1. The means 1 generates three pseudo sine-wave signals CA, CB and –CA that differ in phase by 90° from one another. The pseudo sine-wave signals CA, CB and –CA are input to a sine-wave-signal generating means 2. The means 2 performs an operation, or resistance division, on the signals CA, CB and –CA, generating pseudo sine-wave signals d0 to d7. The signals d0 to d7 pass through an impedance adjusting means 5 and are converted to signals d0' to d7'. These signals d0' to d7' are supplied to a comparing means 3. The comparing means 3 performs digitalization on the signals d0' to d7', generating digitalized signals D0 to D7. The digitalized signals D0 to D7 are supplied to an interpolation circuit 4. The interpolation circuit 4 generates two-phase encoder digital signals A and B from the digitalized signals D0 to D7. The signals A and B differ in phase by 90°.

Jpn. Pat. Appln. KOKAI Publication No. 2001-56238 teaches the technique of supplying three pseudo sine-wave signals CA, CB and –CA directly to a sine-wave signal generating means 2. It is desired that the pseudo sine-wave signals CA, CB and –CA be at the same reference potential. If so, the means 2 can generate, from the signals CA, CB and –CA, pseudo sine-wave signals d0 to d7 that accord with a specific resistance ratio. Namely, the pseudo sine-wave signals d0 to d7 generated by the sine-wave signal generating means 2 are at phase intervals set by the resistance ratio. If the resistance ratio of such a value that the signals d0 to d7 are at regular phase intervals, the signals d0 to d7 will be at regular intervals at the same reference voltage. Thus, the interpolation circuit 4 can perform interpolation at high precision.

BRIEF SUMMARY OF THE INVENTION

According to a first aspect of the present invention, there is provided an encoder comprising:

a scale which has an optical, magnetic or electrostatic displacement detection pattern;

an encoder head which detects the displacement detection pattern and outputs at least two periodic signals that differ in phase, from which a displacement with respect to the scale is to be determined;

a center-voltage detecting unit which detects only a center voltage of each periodic signal; and a reference-voltage adjusting unit which adjusts the center voltage detected by the center-voltage detecting unit to a predetermined reference voltage.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Embodiments of the present invention will be described, with reference to the accompanying drawings.

First Embodiment

Figure 1:
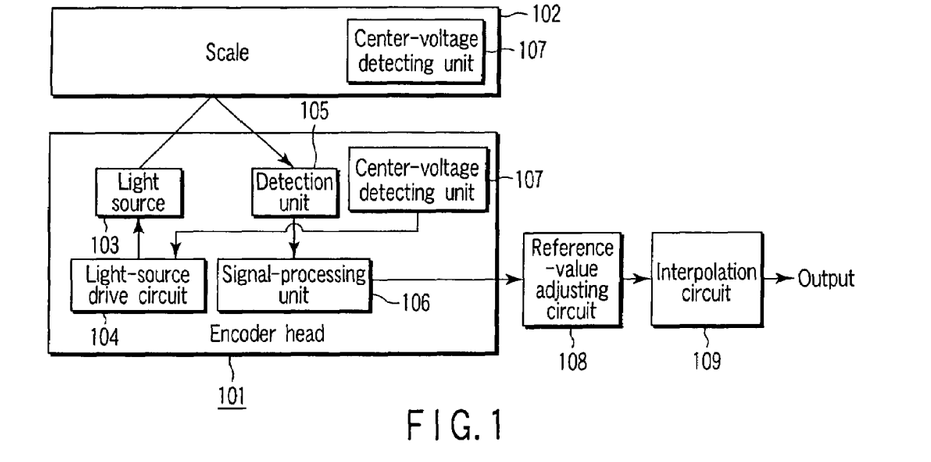
FIG. 1 is a diagram showing the configuration of an encoder according to a first embodiment of the present invention.

FIG. 1 is a diagram showing the configuration of an encoder according to a first embodiment of this invention. The encoder of FIG. 1 is an optical encoder of reflection type.

As shown in FIG. 1, the encoder is composed of an encoder head 101 and a scale 102. The scale 102 has a displacement detection pattern that consists of elements arranged at regular intervals. The scale 102 is attached to a moving body and can be displaced with respect to the encoder head 101.

The encoder head 101 has a light source 103, a light-source drive circuit 104, a detection unit 105, and a signal-processing circuit 106. The light source 103 applies an interfering light beam to the scale 102. The light-source drive circuit 104 supplies a drive current to, or applies a drive voltage to, the light source 103. The light source 103 is thereby driven. The detection unit 105 receives a pattern projected from the scale 102 as the scaled is illuminated with the light beam emitted from the light source 103. Upon receiving the light beam, the detection unit 105 generates a current signal that is proportional to the amount of light received. The detection unit 105 is composed of, for example, four photodiodes. The photodiodes generate four current signals that differ in phase by 90° from one another.

Figure 2A:
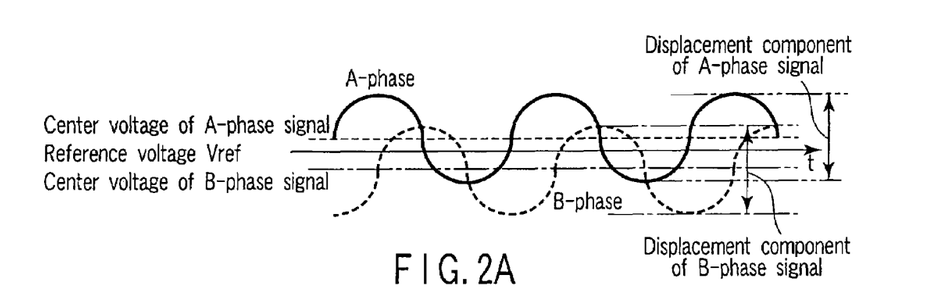
FIG. 2A is a diagram illustrating encoder analog signals.

The signal-processing circuit 106 converts the four current signals output from the four photodiodes of the detection unit 105 to four voltage signals that differ in phase by 90° from one another. The signal-processing circuit 106 subtracts one of the two voltage signals that differ in phase by 180°, from the other of these two voltage signals. Further, the circuit 106 subtracts one of the remaining two voltage signals that differ in phase by 180°, from the other of these two voltage signals. In some cases, the signal obtained through the subtraction is amplified, removing an equivalent component from each of the two voltage signals that differ in phase by 180°. The signal-processing circuit 106 therefore outputs two encoder analog signals whose center voltage is reference voltage Vref. FIG. 2A shows these two encoder analog signals (A phase and B phase). The number of signals that the circuit 106 outputs is not limited to two. The circuit 106 may output two to four periodic signals that differ in phase by 90° from one another.

Figure 2B:
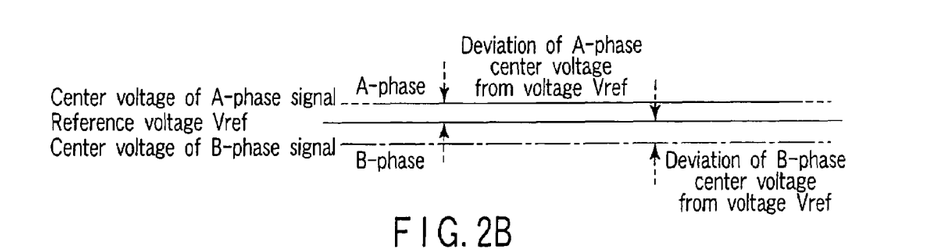
FIG. 2B is a diagram illustrating signals of the center voltage only.

In the first embodiment, the center voltage of either encoder analog signal deviates from the reference voltage Vref, it should be adjusted to the reference voltage Vref. To this end, a center-voltage detecting unit 107 is provided on the encoder head 101 or the scale 102, or both. Then, that component of each encoder analog signal which is at the reference voltage Vref is extracted, and the component that change as the encoder head 101 and the scale 102 move relative to each other is not extracted at all. Put another way, the center-voltage detecting unit 107 causes the signal-processing circuit 106 to output, to a reference-value adjusting circuit 108, only the center-voltage component of each periodic signal generated by the encoder head 101. The reference-value adjusting circuit 108 can detect the center-voltage component of each periodic signal. The center-voltage component is such an A-phase a signal or a B-phase signal as shown in FIG. 2B.

The reference-value adjusting circuit 108 adjusts that part of the signal output from the encoder head 101, which is at the center voltage, to the reference voltage Vref when the center-voltage detecting unit 107 is enabled to perform its function.

The reference-value adjusting circuit 108 is connected to an interpolation circuit 109. The interpolation circuit 109 performs interpolation on one-cycle parts of two periodic signals that differs in phase by 90°. The circuit 109 is an interpolation circuit of, for example, the resistance-division type. The circuit 109 is composed of resistors connected in series. To the first resistor of this series, two encoder analog signals different in phase by 90° are input from the reference-value adjusting circuit 108. The interpolation circuit 109 performs digitalization and logic processing on the signals at the nodes of the resistors, generating encoder digital signals that differ in phase by 90°. The resistors constituting the interpolation circuit 109 have such resistances that they cooperate to generate signals whose intermediate phases differ by a desired value, from the two input signals which differ in phase by 90°.

The above-mentioned reference voltage Vref is the reference voltage that the interpolation circuit 109 uses in the digitalization. The voltage Vref is, for example, half the power-supply voltage. The interpolation circuit 109 is not limited to the resistance-division type. It may be of another type that performs any other interpolation method.

Even if the two periodic signals output from the encoder head 101 have their center voltage deviating from the reference voltage Vref, their center voltage is adjusted to the reference voltage Vref before they are input to the interpolation circuit 109. Therefore, the circuit 109 can generate signals whose intermediate phases differ by the value that the resistors connected in series have set. This enhances the precision of encoder digital signals.

In the encoder according to the first embodiment, a signal component resulting from change in the distance between the encoder head 101 and the scale 102 is not detected when the center-voltage detecting unit 107 is enabled. Hence, the center voltage can be easily adjusted to the reference voltage Vref, while the encoder head 101 and the scale 102 remain in their respective actual-use positions. The precision of the encoder digital signals can therefore increase.

The first embodiment is not limited to an optical encoder of reflection type. It may be an optical encoder of transmission type, instead. Further, the encoder head 101 and the scale 102 may be either of magnetic type or capacitive type. The magnetic encoder and the capacitive encoder can achieve the same advantages as the optical encoder of reflection type.

In the first embodiment, the encoder analog signals differ in phase by 90°. Nonetheless, the encoder analog signals output from the encoder head 101 may have a phase difference other than 90°. Encoder analog signals can be output in any numbers and can differ in phase by any other angle.

To render the encoder smaller or less expensive, the reference-value adjusting circuit 108 and the interpolation circuit 109 may be fabricated on the same semiconductor substrate.

Second Embodiment

Figure 3:
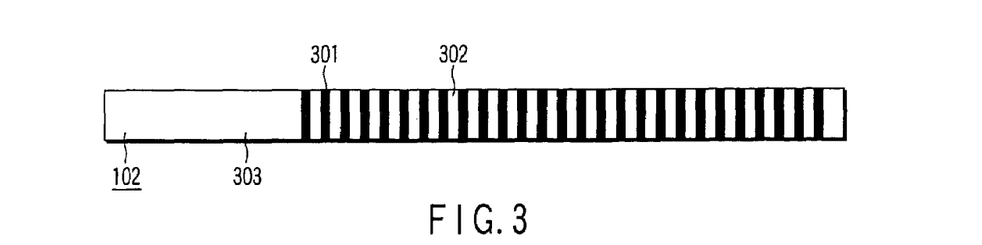
FIG. 3 is depicts a scale used as center-voltage detecting unit in a second embodiment of this invention.

A second embodiment of the present invention will be described. This embodiment is a specific structure for the center-voltage detecting unit 107. The center-voltage detecting unit 107 according to the second embodiment is a part of the scale 102, as is illustrated in FIG. 3. As FIG. 3 shows, the scale 102 has a displacement detection pattern. The pattern consists of non-reflecting stripes 301 and reflecting stripes 302. The scale 102 has at least one part 303 on which the displacement detection pattern is formed.

When the encoder head 101 is at the part 303 of the scale 102, it detects no signal components resulting from the displacement detection pattern. More precisely, the detection unit 105 of the encoder head 101 generates four signals of the same level as the encoder head 101 scans the part 303 of the scale 102. Hence, the encoder head 101 outputs only the center-voltage component of each encoder analog signal.

The reflectance of the part 303 having no displacement detection patterns is not limited to a particular value. Nonetheless, it is preferably almost the same as the reflectance of the reflecting stripes 302. Then, deviation of the center-voltage signals output from the encoder head 101 include, not only due to the offset voltage of the signal-processing circuit 106, but also due to the different amounts of light applied to the photodiodes of the detection unit 105. (The photodiodes emit different amounts of light because of the optical features of the encoder head 101 and the positional relation between the encoder head 101 and the scale 102.) That is, if the part 303 has almost the same reflectance as the reflecting stripes 302, the center voltage of the encoder head 101 included the deviation can be adjusted to the reference voltage Vref. This can enhance the precision of the encoder digital signals.

The scale 102 shown in FIG. 3 has a part 303 on which neither non-reflecting stripes nor reflecting stripes are formed. This part 303 may be provided on a member other than the scale 102.

The technical features of the second embodiment may be applied not only to optical encoders of reflection type, but also to optical encoders of transmission type, magnetic encoders and capacitive encoders. If applied to these encoders, they will bring forth the same advantage as in the optical encoder of reflection type.

Third Embodiment

A third embodiment of this invention will be described. The third embodiment is another structure for the center-voltage detecting unit 107. The unit 107 according to the third embodiment is incorporated in an encoder head 101. The center-voltage detecting unit 107 can control the light-source drive circuit 104 in order to interrupt the emission of light from the light source 103.

More specifically, when the center-voltage detecting unit 107 is activated, the light source 103 stops emitting light. At this time, the output of the encoder head 101 is at a specific level that deviates from the reference voltage Vref as is illustrated in FIG. 2B. The reference-value adjusting circuit 108 eliminates this deviation, or adjusts the level of the output to the reference voltage Vref. As a result, the output of the encoder head 101 is adjusted to the reference voltage Vref. Note that the deviation of the signals output from the encoder head 101 depends on the offset voltage of the signal-processing circuit 106. The output of the encoder head 101 may not deviate at all in some cases.

After the output of the encoder head 101 is so adjusted, the center-voltage detecting unit 107 is disabled and the light source 103 is made to emit light. The encoder therefore generates signals, which are supplied to the reference-value adjusting circuit 108. The circuit 108 generates periodic signals that have a center voltage identical to the reference voltage Vref.

In the third embodiment described above, the encoder digital signals generated by the interpolation circuit 109 are enhanced in precision by interrupting the emission of light from the light source 103 and adjusting the center voltage of the signals output from the encoder head 101 to the reference voltage Vref.

In the third embodiment, the light source 103 is turned off, thus interrupting the emission of light to the scale 102. Instead, a shield may be interposed between the light source 103 and the scale 102. Alternatively, a switch may be connected between the detection unit 105 and the signal-processing circuit 106 and be turned off. In either case, the same effect can be attained as in the case where the light source 103 is turned off. In the third embodiment is a magnetic encoder or a capacitive encoder, it suffices to disconnect a resistor or a capacitor, provided in the detection unit 105, from the signal-processing circuit 106.

Fourth Embodiment

Figure 4:
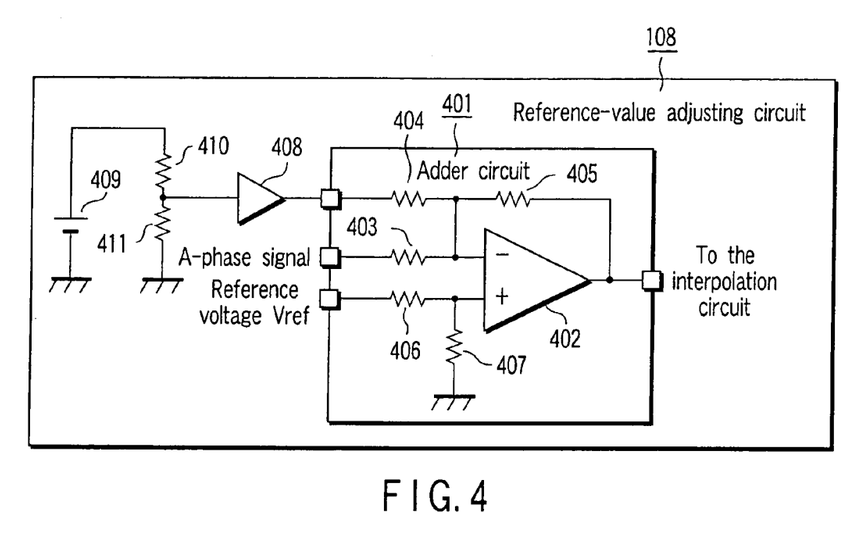
FIG. 4 is a circuit diagram of the reference-value adjusting circuit provided in a fourth embodiment of this invention.

A fourth embodiment of this invention will be described. The fourth embodiment is another structure for the reference-value adjusting circuit 108 shown in FIG. 1. FIG. 4 is a circuit diagram of this reference-value adjusting circuit 108, which includes an adder circuit 401. Note that FIG. 4 shows only the unit for the A-phase signal. Nevertheless, the circuit 108 has as many units as encoder analog signals input to the circuit 108 from the encoder head 101. If the encoder head 101 outputs two signals as shown in FIG. 2, the fourth embodiment will have two reference-value adjusting circuits 108.

In the adder circuit 401, resistors 403 and 404 are connected to an inverting input terminal of the operation amplifier 402. A resistor 405 is connected between the inverting input terminal and output terminal of the operational amplifier 402. Resistors 406 and 407 are connected to the non-inverting input terminal of the operational amplifier 402. The encoder head 101 inputs an A-phase signal to the open end of the resistor 403. The reference voltage Vref is applied to the open end of the resistor 406. The open end of the resistor 407 is connected to the ground GND. The open end of the resistor 404 is connected by a buffer 408 to the node of the resistors 410 and 411. The other end of the resistor 410 is connected to a power supply 409 that is stable, despite the changes in the power-supply voltage or the environmental changes. The other end of the resistor 411 is connected to the ground GND.

Only the center voltage of such a signal as shown in FIG. 2B is input not the adder circuit 401 when the center-voltage detecting unit 107 is enabled. A voltmeter, for example, detects the voltage applied from the adder circuit 401 at this time. The voltage between the resistors 410 and 411 is controlled, thereby adjusting the voltage detected to the reference voltage Vref. The voltage can be controlled by adjusting the resistance ratio between the resistors 410 and 411, which are variable resistors. The voltage of the power supply 409 may of course be changed, instead.

After the center voltage is thus controlled, the center-voltage detecting unit 107 may be disabled and the encoder is operated. Then, the encoder head 101 an A-phase signal corresponding to the displacement of the scale 102 with respect to the encoder head 101, or vice versa. The A-phase signal is input to the adder circuit 401. The adder circuit 401 applies a voltage that adjusts the center voltage of the A-phase signal to the reference voltage Vref. Consequently, the reference-value adjusting circuits 108 outputs the A-phase signal whose center voltage is the reference voltage Vref. Thus, the encoder signal of the interpolation circuit 109 receives has a center voltage identical to the reference voltage Vref. The interpolation circuit 109 can therefore generate an encoder digital signal of high precision.

Figure 5:
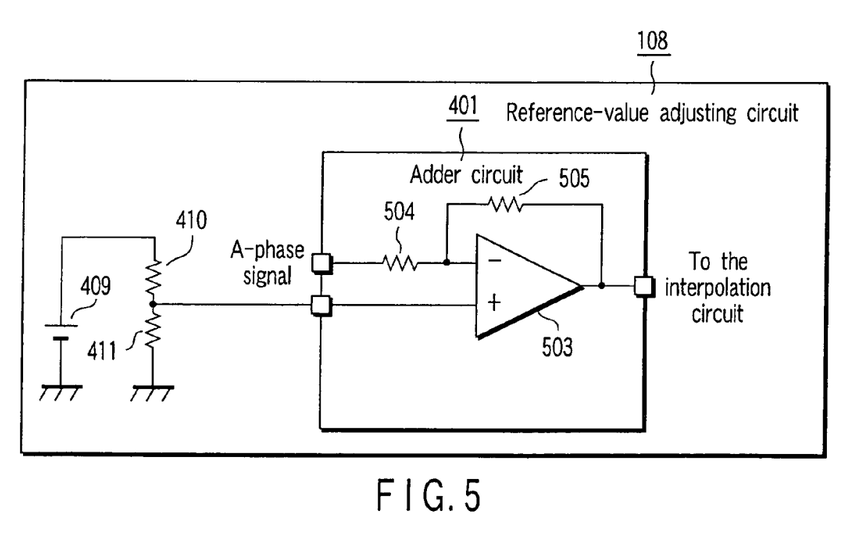
FIG. 5 is a diagram showing a first modification of the adder circuit incorporated in the reference-value adjusting circuit.

The adder circuit may have the configuration shown in FIG. 5. In the adder circuit of FIG. 5, a resistor 504 is connected to the inverting input terminal of an operational amplifier 503. A resistor 505 is connected between the inverting input terminal and output terminal of the operational amplifier 503. The node of resistors 410 and 411 is connected by no buffers to the non-inverting input terminal of the operational amplifier 503. The other end of the resistor 410 is connected to the power supply 409. The other end of the resistor 411 is connected to the ground GND.

In the reference-value adjusting circuits 108 of FIG. 5, the center voltage of the encoder analog signal can be set to the reference voltage Vref by adjusting the voltage between the resistors 410 and 411 after the center-voltage detecting unit 107 is enabled.

Figure 6:
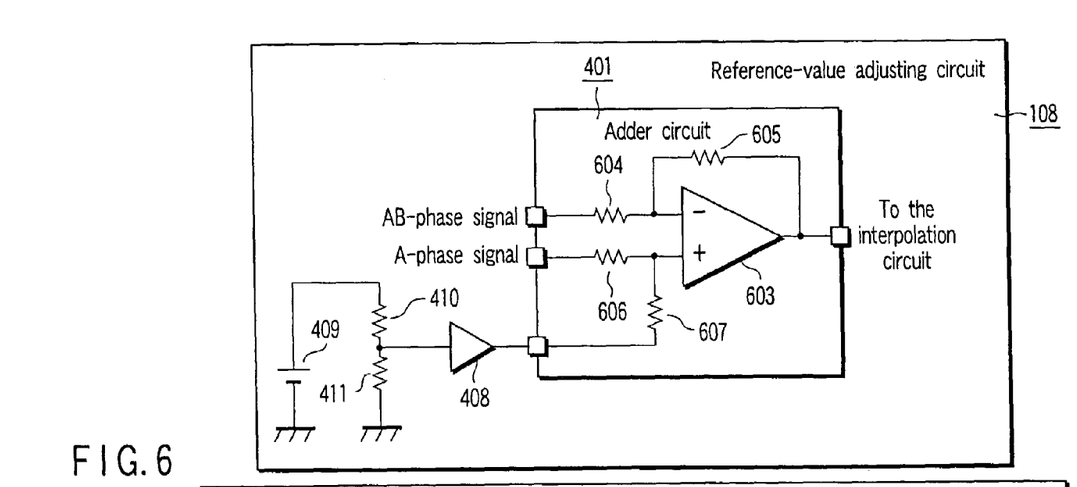
FIG. 6 is a diagram showing a second modification of the adder circuit.

FIG. 6 shows a reference-value adjusting circuits 108 of another configuration. The adder circuit 401 incorporated in this circuit 108 is configured to output four encoder analog signals (A-phase signal, B-phase signal, AB-phase signal, and BB-phase signal). In the adder circuit shown in FIG. 6, a resistor 604 is connected to the inverting input terminal of an operational amplifier 603. A resistor 605 is connected between the inverting input terminal and output terminal of the operational amplifier 603. Resistors 606 and 607 are connected to the non-inverting input terminal of the operational amplifier 603. The open end of the resistor 604 receives the AB-phase signal from the encoder head 101. The open end of the resistor 606 receives the A-phase signal from the encoder head 101. The node of resistors 410 and 411 identical to those shown in FIG. 4 is connected by a buffer 408 to the resistor 607. The other end of the resistor 410 is connected to the power supply 409. The other end of the resistor 411 is connected to the ground GND.

In the reference-value adjusting circuits 108 of FIG. 6, the output of the buffer 408 is controlled after enabling the center-voltage detecting unit 107. The operational amplifier 603 therefore outputs the reference voltage Vref. Thus, the center voltage of the encoder analog signal that has been output from the interpolation circuit 109 can be set to the reference voltage Vref. Moreover, noise can be removed from the A-phase signal and the AB-phase signal, both input to the adder circuit 410. The encoder digital signal output from the interpolation circuit 109 can therefore be improved in terms of precision.

In the fourth embodiment described above, how much the center voltage of an encoder analog signal deviates from the reference value can be determined, merely by detecting the output voltage of the reference-value adjusting circuits 108 by using an inexpensive measuring device such as a voltmeter. The center voltage can be detected and adjusted after the encoder is assembled or immediately after the supplying of power to the encoder is started.

Fifth Embodiment

Figure 7:
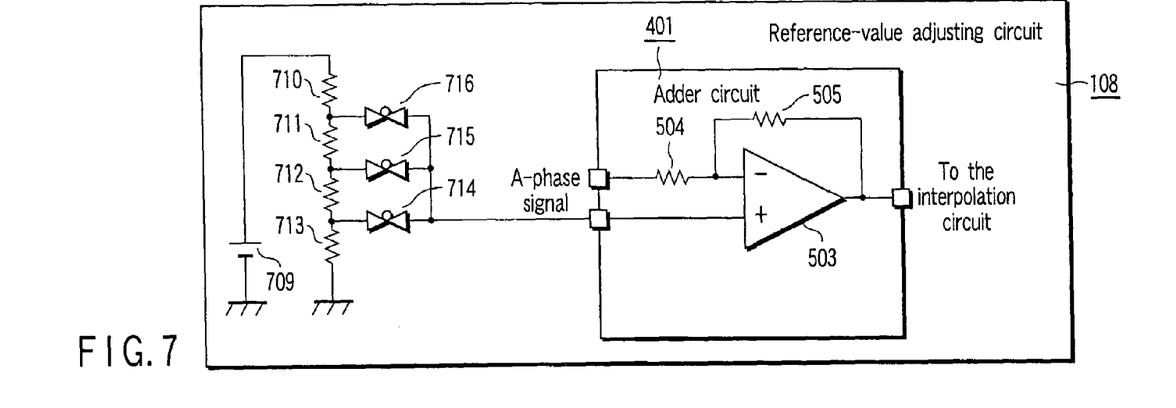
FIG. 7 is a circuit diagram of the reference-value adjusting circuit provided in a fifth embodiment of the invention.

A fifth embodiment of this invention will be described. The fifth embodiment includes a reference-value adjusting circuit 108 that has the configuration shown in FIG. 7. FIG. 7 depicts only one section that processes the A-phase signal. Note that the adder circuit 401 shown in FIG. 7 is identical in structure to the adder circuit shown in FIG. 5. As shown in FIG. 7, resistors 710, 711, 712 and 713 are connected in series between the ground GND and a power supply 709. The power supply 709 applies a stable voltage, operating stably, despite the environmental changes. Switches 714, 715 and 716 are connected at one end to the nodes of the resistors 710 to 713. The switches 714, 715 and 716 are connected at the other end to the non-inverting input terminal of the operation amplifier 503 that is provided in the adder circuit 401.

To adjust the center voltage of any encoder analog signal, the center-voltage detecting unit 107 is enabled, and the switches 714, 715 and 716 are turned on or off, setting voltages between the resistors 710 to 713, so that the voltage output from the operational amplifier 503 may be equal to the reference voltage Vref.

In the fifth embodiment described above, the center voltage of the encoder analog signal to be output to the interpolation circuit 109 is adjusted to the reference voltage Vref or to a value similar to the voltage Vref, merely by turning on or off the switches 714, 715 and 716. The center voltage can therefore be easily adjusted. In addition, the switches 714, 715 and 716 can be turned on or off automatically, by detecting the potential level of the encoder analog signal output to the interpolation circuit 109 and then feeding back the potential level detected. If the switches 714, 715 and 716 are automatically turned on or off, expensive and large-scale circuits, such as A/D converting circuit and CPU, need not be used, and the reference-value adjusting circuit 108 can therefore be smaller and less expensive. A unit that can turn the switches 714, 715 and 716 on and off automatically may be simple, constituted by a comparing circuit, a logic circuit, and a memory circuit. The comparing circuit compares the center voltage applied to the reference-value adjusting circuit 108 with the sum of the reference voltage Vref and an adjusting margin. The logic circuit turns each switch on or off in accordance with the result of the comparison. The memory circuit stores the data representing whether each switch is turned on or not at the center voltage falls within the range from (Vref−adjusting margin) and (Vref+adjusting margin).

The number of resistors used and the number of switches used are not limited to three. The more resistors and switches are used, the more accurately the center voltage can be adjusted to the reference voltage Vref.

Terminals may be connected to the nodes of the resistors 710, 711, 712 and 713 and the reference voltage Vref may be applied to these terminals. In this case, the value by which the center voltage is adjusted for each switch is proportional to the distance between the switch and the input terminal to which the reference voltage Vref is applied.

Sixth Embodiment

A sixth embodiment of this invention will be described. The sixth embodiment is the configuration of FIG. 8, which the reference-value adjusting circuit 108 used in the sixth embodiment may have.

Figure 8:
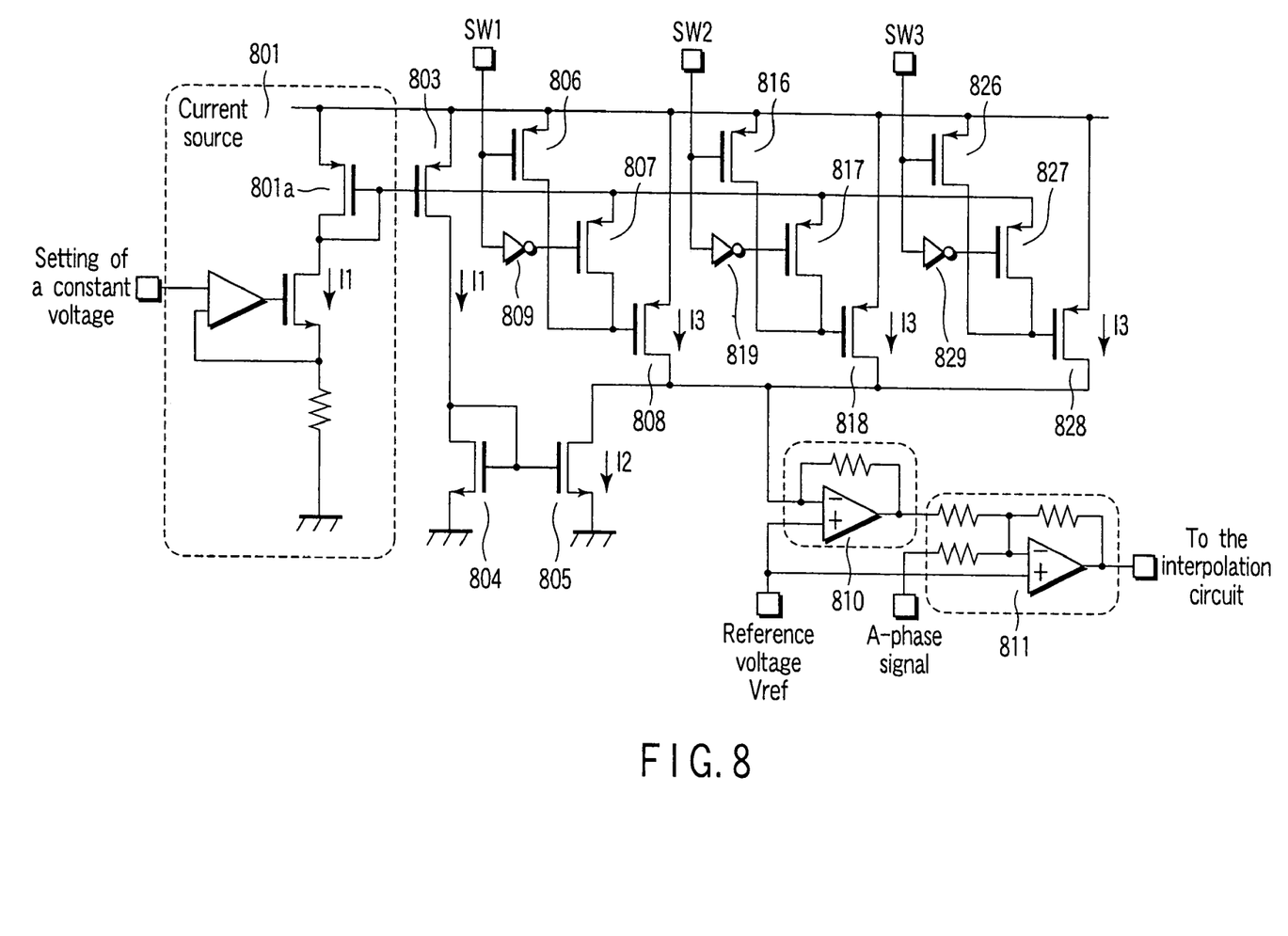
FIG. 8 is a circuit diagram of the reference-value adjusting circuit provided in a sixth embodiment of the invention.

As shown in FIG. 8, a constant voltage is applied to a current source 801. This voltage is stable, not influenced by changes in the power-supply voltage or by the environmental changes, is applied to a current source 801. Transistors 801a and 803 that have the same size constitute a current-mirror circuit. The transistor 803 is connected to a transistor 804. This transistor 804 and a transistor 805 constitute a current source of the current-mirror type (i.e., sink-current source). The transistor 805 is twice as large as the transistor 804. Hence, the current I2 that flows in the transistor 805 is twice as large as the current I1 that flows in the transistor 803.

Three transistors 808, 818 and 828 are connected to the transistor 805. The transistors 808, 818 and 828 are identical so that a current I3 equal to the current I1 that flows in the transistor 803 may flow in them. Transistors 806 and 807 and an inverter 809 are connected to the transistor 808 as illustrated in FIG. 8. Transistors 816 and 817 and an inverter 819 are connected to the transistor 818 as shown in FIG. 8. Transistors 826 and 827 and an inverter 829 are connected to the transistor 828 as shown in FIG. 8. The transistor 806 and the inverter 809 are connected to a switch SW1. The transistor 816 and the inverter 819 are connected to a switch SW2. The transistor 826 and the inverter 829 are connected to a switch SW3. The transistors 807, 817 and 827 are connected to a current-mirror circuit that is constituted by the transistors 801a and 803.

In the configuration of FIG. 8, the transistors 808, 818 and 828, the transistors 806, 816 and 826, the transistors 807, 817 and 827, and the inverters 809, 819 and 829 constitute a current source (i.e., source-current source) that supplies currents I3 from the transistors 808, 818 and 828, respectively.

The node of the transistor 808 and the transistor 805, the node of the transistor 818 and the transistor 805, and the node of the transistor 828 and the transistor 805 are connected to a current-to-voltage converting circuit 810. The output of the current-to-voltage converting circuit 810 is connected to an adder circuit 811. The reference voltage Vref is applied to the current-to-voltage converting circuit 810. The reference voltage Vref and an A-phase signal are input to the adder circuit 811.

In the configuration of FIG. 8, the reference current I1 generated in the current source 801 is turned back in the current-mirror circuit constituted by the transistors 801a and 803. The current I2 thus turned back is supplied to the transistor 804.

When any one of the switches SW1, SW2 and SW3 is turned on, one of the transistors 808, 818 and 828 is turned on. Current I3 therefore flows from the transistor thus turned on, to the transistor 805. In this case, a current of the same magnitude as the current I3 is supplied from the output terminal of the current-to-voltage converting circuit 810 to the transistor 805 so that current I2 (=2×I3) may flow in the transistor 805. The output of the current-to-voltage converting circuit 810 is therefore Vref+I3×R, where R is feedback resistance.

When any two of the switches SW1, SW2 and SW3 are turned on, two of the transistors 808, 818 and 828 are turned on. Current I3 therefore flows from both transistors turned on, to the transistor 805. And current I2 flows to the transistor 805. In this case, the output of the current-to-voltage converting circuit 810 is Vref.

When the switches SW1, SW2 and SW3 are all turned on, Current I2 (=2×I3) flows to the transistor 805, and current I3, which cannot be supplied to the transistor 805, flows to the current-to-voltage converting circuit 810. As a result, the output of the current-to-voltage converting circuit 810 is Vref−I3×R.

Thus, in the circuit configuration of FIG. 8, a voltage that changes within the range from Vref−I3×R to Vref+I3×R can be applied to the adder circuit 811.

In the sixth embodiment described above, the encoder head 101 outputs only the center voltage of the encoder analog signal to the reference-value adjusting circuit 108 of FIG. 8. Further, the switches SW1, SW2 and SW3 are turned on or off so that the output of the adder circuit 811 may be equal to the reference voltage Vref or may approach the reference voltage Vref. The center voltage can therefore be adjusted. Hence, the encoder analog signal whose center voltage is equal or similar to the reference voltage Vref can be supplied to the interpolation circuit 109. The interpolation circuit 109 can therefore output a high-precision encoder digital signal.

FIG. 8 illustrates only a circuit unit for only the A-phase signal of the encoder head has generated. The same circuit unit may be used for the other phase signals. The circuit of FIG. 8 has only three switches. The circuit may include more switches so that the center voltage of the encoder analog signal may be more minutely adjusted toward the reference voltage Vref. For example, the circuit may have five switches. If this is the case, a transistor three times as large as the transistor 804 is used as transistor 805 (thus, I2=3×I3), and the center voltage of the encoder analog signal can be Vref± (2×I3×R). Moreover, current I2 may be changed. In other words, the current from a sink-current source may be changed, not using switches to change the current from a source-current source as in the circuit of FIG. 8. Changing the current from a sink-current source achieves the same advantage as in the circuit of FIG. 8.

In the sixth embodiment, too, the switches can be automatically turned on or off, while detecting the potential level of the encoder analog signal.

Seventh Embodiment

A seventh embodiment of the present invention will be described with reference to FIG. 9. The seventh embodiment includes a reference-value adjusting circuit 108 that has the configuration shown in FIG. 7. The circuit of FIG. 9 differs from that of FIG. 7 in that the output terminals of shift registers 920, 921 and 923 are connected to the switches 714, 715 and 716, respectively. Thus, every time a clock pulse is input to the clock terminals of the shift registers 920, 921 and 923, the on-off setting of the set terminals of the shift registers 920, 921 and 923 is set for the switches 714, 715 and 716.

In the seventh embodiment, so many terminals as the switches need not be provided for the switches. The more terminals the circuit has for switches, the more set terminals will be used as terminals for switches. Assume that the reference-value adjusting circuit 108 and the interpolation circuit 109 are formed in the same semiconductor substrate to provide a small and inexpensive encoder. Then, the chip size of the encoder will inevitably increase. In view of this, the seventh embodiment, which has a few terminals, helps to provide a small and inexpensive encoder.

Figure 9:
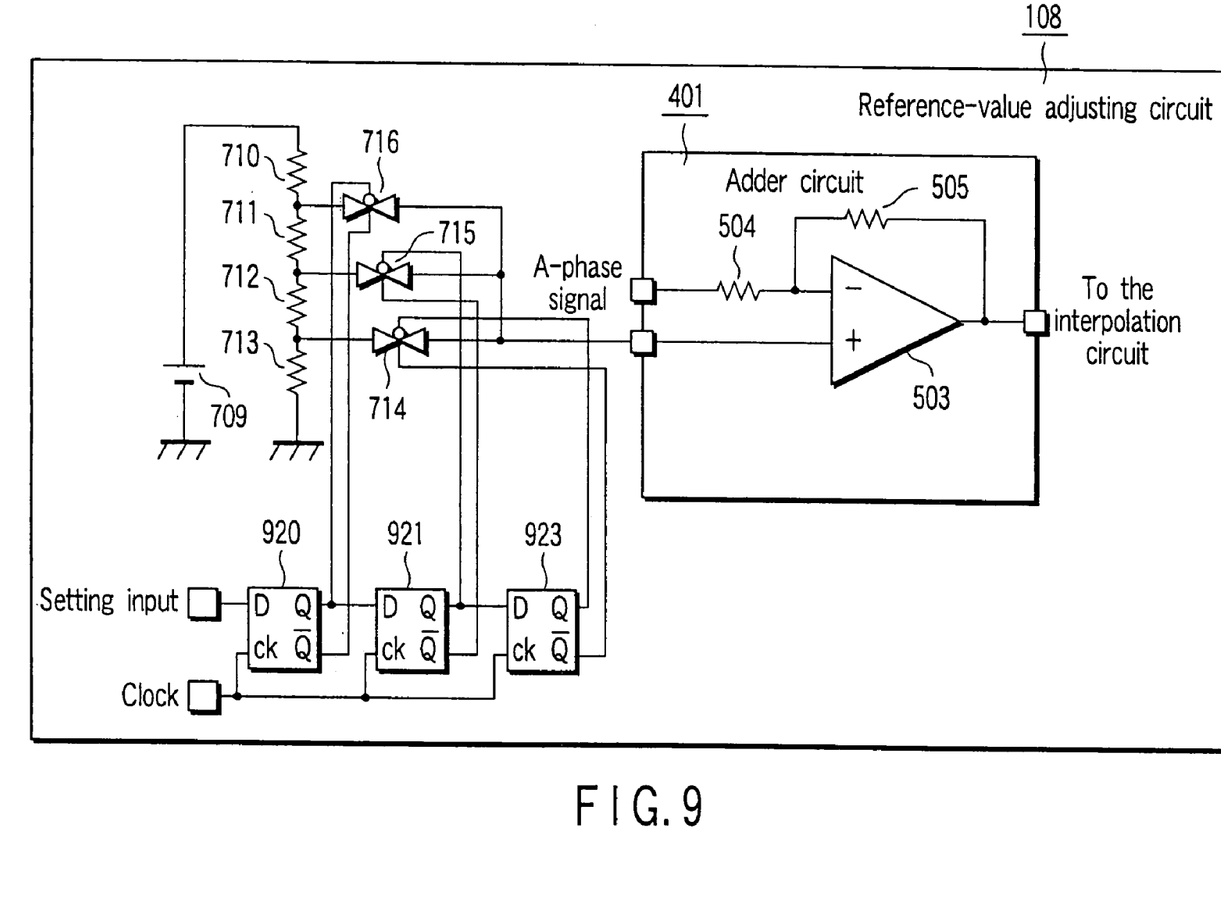
FIG. 9 is a circuit diagram of the reference-value adjusting circuit provided in a seventh embodiment of this invention.

Shift registers of the type shown in FIG. 9 may be connected to the switches SW1, SW2 and SW3 in the circuit of FIG. 8.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An encoder comprising:
   a scale which has an optical, magnetic or electrostatic displacement detection pattern;
   an encoder head which detects the displacement detection pattern and outputs at least two periodic signals that differ in phase, from which a displacement with respect to the scale is to be determined;
   a center-voltage detecting unit which detects only a center voltage of each periodic signal by detecting an output of the encoder head while preventing extraction of a component that changes as the scale and the encoder head move relative to each other; and
   a reference-voltage adjusting unit which adjusts the center voltage detected by the center-voltage detecting unit to a predetermined reference voltage.

2. The encoder according to claim 1, wherein the center-voltage detecting unit detects only the center voltage from an output of the encoder head, while the encoder head remains at a position where the displacement detection pattern is unable to be detected.

3. The encoder according to claim 2, wherein the scale has at least one part not having the displacement detection pattern, and the position where the displacement detection pattern is unable to be detected is the part not having the displacement detection pattern.

4. The encoder according to claim 1, wherein the encoder head includes one component selected from the group consisting of a light source used to detect an optical displacement detection pattern, a resistance used to detect a magnetic displacement detection pattern and a capacitor used to detect an electrostatic displacement detection pattern, and the center-voltage detecting unit detects on the center voltage from an output of the encoder head, while no bias is being supplied to the light source, the resistor or the capacitor.

5. The encoder according to claim 1, wherein the encoder head includes one component selected from the group consisting of a light source used to detect an optical displacement detection pattern, a resistance used to detect a magnetic displacement detection pattern and a capacitor used to detect an electrostatic displacement detection pattern, and a processing unit which processes an output of the light source, the resistor or the capacitor, thereby generating at least two periodic signals that differ in phase; and the center-voltage detecting unit detects the center voltage from an output of the encoder head, while the processing unit remains disconnected from the light source, the resistor or the capacitor.

6. An encoder comprising:
- a scale which has an optical, magnetic or electrostatic displacement detection pattern;
- an encoder head which detects the displacement detection pattern and outputs at least two periodic signals that differ in phase from which a displacement with respect to the scale is to be determined;
- a center-voltage detecting unit which detects only a center voltage of each periodic signal; and
- a reference-voltage adjusting unit which adjusts the center voltage detected by the center-voltage detecting unit to a predetermined reference voltage,
- wherein the reference-voltage adjusting unit includes an adding unit which adds a difference between the center voltage and the predetermined reference voltage to the center voltage, thereby adjusting the center voltage to the predetermined reference voltage.

7. The encoder according to claim 6, wherein the reference-voltage adjusting unit includes a plurality of resistors which are connected in series between two potentials that differ by a specific value; and the adding unit is connected to nodes of the resistors, either directly or through a buffer.

8. The encoder according to claim 7, wherein the resistors are three or more resistors connected in series, and the reference-voltage adjusting unit includes a plurality of switches which are connected at one end to the nodes of the resistors, respectively, and at the other end to the input of the adding unit.

9. An encoder comprising:
- a scale which has an optical, magnetic or electrostatic displacement detection pattern;
- an encoder head which detects the displacement detection pattern and outputs at least two periodic signals that differ in phase, from which a displacement with respect to the scale is to be determined;
- a center-voltage detecting unit which detects only a center voltage of each periodic signal; and
- a reference-voltage adjusting unit which adjusts the center voltage detected by the center-voltage detecting unit to a predetermined reference voltage, the reference-voltage adjusting unit including:
  - a reference-voltage generating circuit which generates a reference voltage;
  - a mirror circuit which is connected to the reference-voltage generating circuit and turns back the reference voltage generated by the reference-voltage generating circuit;
  - a sink-current source which is connected to the mirror circuit and configured to supply a current that is an integral multiple of the reference current turned back by the mirror circuit;
  - a source-current source which is connected in series to the sink-current source and supplies a current to the sink-current source;
  - a current-to-voltage converting circuit which has an input terminal connected to a node of the sink-current source and the source-current source and an output terminal connected to the adding circuit; and
  - a switch which is operated to select either a current of a specific magnitude, to be supplied to the sink-current source, or a current of a different magnitude, to be supplied to the source-current source.

10. The encoder according to claim 8, wherein a shift register is connected at output to the switch.

11. The encoder according to claim 9, wherein a shift register is connected at output to the switch.

12. The encoder according to claim 1, further comprising an interpolation circuit which generates signals by dividing a one-cycle duration of at least two periodic signals that differ in phase.

13. The encoder according to claim 2, further comprising an interpolation circuit which generates signals by dividing a one-cycle duration of at least two periodic signals that differ in phase.

14. The encoder according to claim 3, further comprising an interpolation circuit which generates signals by dividing a one-cycle duration of at least two periodic signals that differ in phase.

15. The encoder according to claim 4, further comprising an interpolation circuit which generates signals by dividing a one-cycle duration of at least two periodic signals that differ in phase.

16. The encoder according to claim 12, wherein at least the interpolation circuit and the reference-voltage adjusting unit are formed on the same semiconductor substrate.

17. The encoder according to claim 13, wherein at least the interpolation circuit and the reference-voltage adjusting unit are formed on the same semiconductor substrate.

18. The encoder according to claim 14, wherein at least the interpolation circuit and the reference-voltage adjusting unit are formed on the same semiconductor substrate.

19. The encoder according to claim 15, wherein at least the interpolation circuit and the reference-voltage adjusting unit are formed on the same semiconductor substrate.

* * * * *